(No Model.)

E. D. TOOPS.
CHURN.

No. 563,100. Patented June 30, 1896.

Witnesses:
J. C. Barnes
M. McDonald.

Inventor:
Emory D. Toops.
By Thurman & Silvius.
Attorneys.

UNITED STATES PATENT OFFICE.

EMORY D. TOOPS, OF INDIANAPOLIS, INDIANA.

CHURN.

SPECIFICATION forming part of Letters Patent No. 563,100, dated June 30, 1896.

Application filed August 21, 1895. Serial No. 560,007. (No model.)

*To all whom it may concern:*

Be it known that I, EMORY D. TOOPS, a citizen of the United States, residing at Indianapolis, in the county of Marion and State of Indiana, have invented certain new and useful Improvements in Churns; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain novel arrangements of parts in the construction of a churn by which the same apparatus is available for either making butter or freezing cream, and is readily adaptable for both summer and winter use; and it consists particularly of the peculiarly advantageous devices by which air is conveniently purified and forced into the milk or cream from the bottom, as will be hereinafter fully described and claimed.

My objects are to provide a churn that shall combine in one machine all requirements for such apparatus for both home use and the dairy and creamery, as well as the ice-cream maker, which may be portable, easily and cheaply manufactured, simple in design, durable in use, and economical in producing the greatest amount with the least waste of material.

A further object is to provide a simple means for introducing air into the bottom of the churn and for removing from the air before using it impurities and dust which it holds in suspension.

A still further object is to provide in one machine a convenient arrangement by which the materials or ingredients to be treated are maintained at a proper temperature at all seasons either when making butter or freezing cream.

My invention accomplishes the above objects and provides a combined churn and ice-cream freezer which may be manufactured so cheaply as to be within the reach of families who could not afford separate apparatus of more expensive construction. When making butter, a superior quality and a greater quantity are produced, and when making ice-cream a superior quality of light cream is the result.

Figure 1:
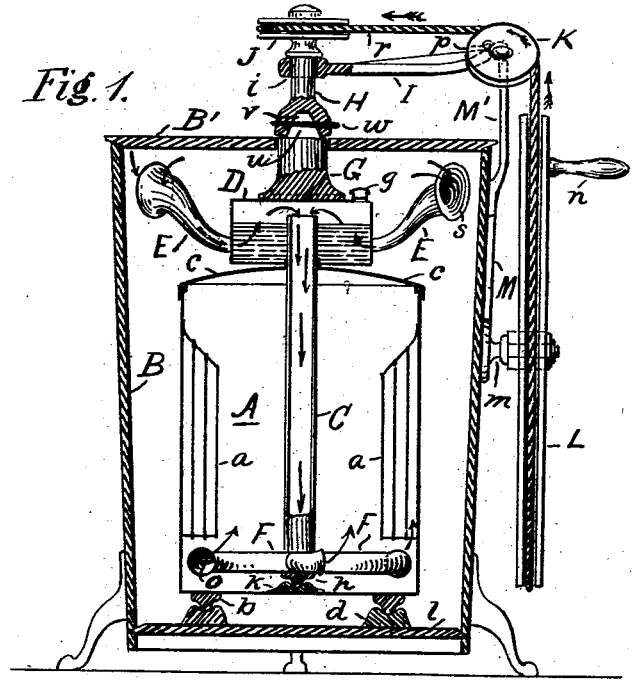
Figure 2:
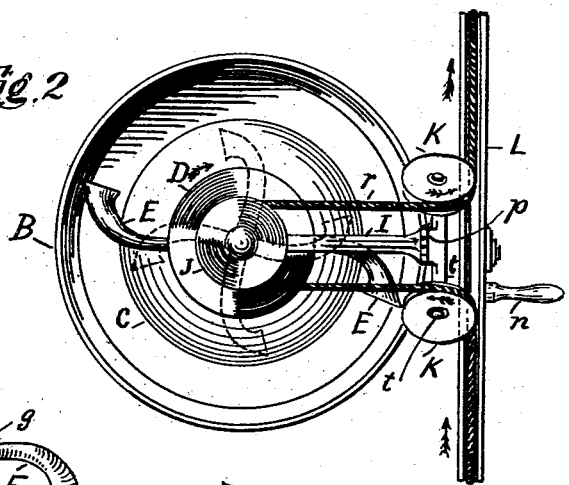
Figure 3:
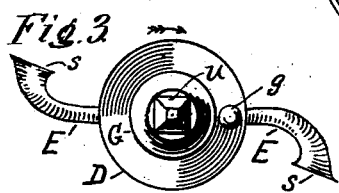
Figure 4:
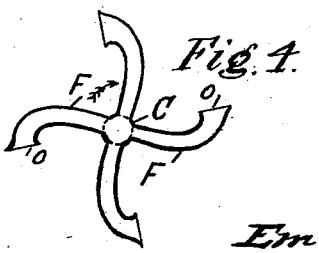

Referring to the drawings, Figure 1 represents a vertical side view with parts in half-section. Fig. 2 is a plan view. Fig. 3 is a plan of water-chamber D and funnels, and Fig. 4 is a plan of hollow dashers F and hollow vertical spindle C.

A clear understanding of the mode of construction will be had by considering that B represents an inclosing tub or barrel combining a frame or support for the whole apparatus, and is preferably made of wood in the usual manner.

A is an inner removable chamber or churn-body proper, made preferably of galvanized iron. Sockets *d* are of metal and attached to the upper side of the bottom of the tub B, and metallic feet or projections *b* are attached to the under side of churn A, fitting into the sockets *d* to prevent the churn-body from rotating and providing a space between the two bottoms for either water or ice, as may be desired. A metallic socket *k* is attached to the upper side of the bottom of churn-body.

A hollow metallic spindle or revoluble shaft C has a number of hollow dashers F integrally attached near its bottom and below said dashers, a step or projection *h* fitting into the socket *k* in which it revolves.

The water-chamber D is made of metal, and the bottom of it is attached to and supported by the spindle C, which extends upward through the bottom of said chamber D to near its top.

The water-chamber D is provided with a number of air-funnels E, which are attached at their small ends at the bottom of said chamber.

A lid *c* covers the churn-body A and has an opening in its center, permitting the spindle C to turn in it freely while preventing dust or impurities from entering the churn.

After the proper speed is attained the air-pressure through the funnels prevents the escape of the water and forces it inward. A suitable filling-opening with plug *g* is provided at the top of chamber D. A short shaft G is fixed to the top of the chamber D and has at its top a shank *u* and transverse hole to receive a pintle or cotter. Removably connected to the shank *u* is a socket *v*, also having a transverse hole registering with the hole in shank *u*, through which a pintle or cotter $w$ is inserted to prevent the separation of the socket and shank while in use. The socket $v$ is at the lower end of a short spindle H, being a part of same. This spindle H is carried by an overhanging arm I, having a journal-bearing $i$. A pulley J is secured to the upper end of spindle H, so that power being applied by the belt $r$ causes a simultaneous rotation of the pulley J, shafts H and G, the chamber D carrying the funnels E, and hollow spindle C carrying the dashers F. A metallic frame M, having an extended arm M' and transverse arms $t$, is attached to the outside of the inclosing tub B. The frame M has an ankle-stud $m$, to which a drive wheel or pulley L is hung by a hole in its central hub, the wheel being revoluble on the stud. The wheel carries a handle $n$ for hand-power, but when used in connection with steam or other power a suitable pulley is attached and secured to the front of the pulley L to take a belt running from any suitable motor. Running on journaled ends of the arms $t$ are guide-pulleys K. The arm I has a hinge $p$ to permit of its being raised to throw back the shaft H and pulley J out of the way when necessary to remove the churn. The tub B has a removable cover B', having in its center a hole through which the shaft G may freely revolve. The lid is applied or removed while the arm I is raised and thrown backward to clear. Removably attached to the inner sides of the churn-body are suitable open-work wire brakes $a$, the function of which is obvious.

To make practical use of my invention, the churn-body A is charged with proper ingredients. If for making butter, the surrounding space between it and the outer vessel or tub may be filled, as may be found desirable, with either warm or cold water to produce the necessary temperature required by the milk or cream to give the best results. If for freezing cream, the space is filled, as usual, with broken ice and salt. The water-chamber D is partly filled with clear water, the covers applied, and shafts connected as in Fig. 1. Power being applied, the wheel L revolves, transmitting motion by the belt $r$ to the pulley J and its connections, all revolving to the right in the direction indicated by the arrows. As the funnels E, like radiating arms having the shaft C for a center, are swung around, air is received into the mouth-openings $s$ of same, and by the velocity is forced through the funnels, through the water in chamber D to its surface emerging free from dust or impurities, and there being no other escape passes into the top opening of the hollow spindle C, is forced downward and through the hollow dashers F, and expelled from their outer ends $o$, thence rising in globules through the mixture, assisting in the process, and in the case of freezing cream insuring a light aerated product.

For the purpose of cleansing the apparatus all parts are readily disconnected, as will be seen. It is obvious that slight variations in details of construction may be made within the limits of my invention.

Having thus described my invention, what I claim as new, and desire to secure by Letters Patent, is—

1. The herein-described improved devices for churns, comprising in combination with a vertical body portion and inclosing tub; a revoluble water-chamber attached to upper portion of a hollow revoluble dasher-shaft, said shaft having its upper end terminating within and near the top of said water-chamber, said water-chamber having a series of radiating curved scooping-funnels attached at their smaller ends to the lower portion of said chamber and extending outwardly therefrom; a series of transverse hollow or tubular dashers radially connected at one end of each to the bottom portion of said dasher-shaft, and having their outer ends curved in a direction in reverse to the curve of said scooping-funnels and terminating in a bell-mouth, and means for rotating said water-chamber, shaft and dashers, substantially as shown and described.

2. In a churn, having a hollow revoluble dasher-spindle and dashers, the combination with the spindle, of the water-chamber D, substantially as shown, attached to said spindle, said chamber having the series of radiating-funnels E attached thereto, and a filling-hole and plug $g$ at the top of said chamber, substantially as shown and described.

3. In a churn, the combination with the body portion having hollow shaft and dashers revoluble inside of said churn, and means to rotate said spindle and dashers, of a revoluble water-chamber attached to the upper portion of said hollow spindle; a series of radiating scooping-funnels attached at their smaller ends to said water-chamber to admit air into said water-chamber and through said hollow spindle to commingle with the liquid ingredients in the churn, substantially as described.

In testimony whereof I affix my signature in presence of two witnesses.

EMORY D. TOOPS.

Witnesses:
M. McDONALD,
J. C. BARNES.